United States Patent [19]

Gearheart et al.

[11] 3,819,912

[45] June 25, 1974

[54] PERFORATED TAPE READER

[75] Inventors: John D. Gearheart, Covina; George Takenaka, Santa Ana, both of Calif.

[73] Assignee: Addmaster Corporation, San Gabreil, Calif.

[22] Filed: May 10, 1973

[21] Appl. No.: 359,086

[52] U.S. Cl. .......................... 235/61.11 E, 178/17 B
[51] Int. Cl. .......................... G06k 7/10, H04l 15/20
[58] Field of Search ............235/61.11 R, 61.11 A, 235/61.11 B, 61.11 C, 61.11 E, 61.12 R; 178/17 R, 17 A, 17 B, 17 D, 17 E, 42; 200/46

[56] References Cited

UNITED STATES PATENTS 3,018,951 1/1962 Harris .......................... 236/61.11 C

*Primary Examiner*—Daryl W. Cook
*Attorney, Agent, or Firm*—Fred N. Schwend

[57] ABSTRACT

A perforated tape reader for different width tapes comprising a rotatable spool member having tape edge guide sections of different widths and locations arranged around the spool. A detenting device for the spool forms a second edge guide means for the tape at a point spaced from the spool. A dirt and light excluding cover, when closed, maintains the tape in tape guided position on the spool and on a feed sprocket.

8 Claims, 8 Drawing Figures

PERFORATED TAPE READER

BACKGROUND OF THE INVENTION

1. Field of the Invention

This invention relates to perforated tape readers and has particular reference to tape readers capable of sensing perforated tape of different sizes.

2. Description of the Prior Art

Perforated tape for storing data is in common use. In such tape, successive lines of holes are provided, each line comprising one or more holes located in different rows or "levels" so as to present, by their number and location, coded representations of different numerals, alphabetical characters or control symbols. Such tapes are provided in different standard widths and channels. For example, perforated tape is available in 5, 6, 7, and 8 levels, the centers of the holes being equally spaced from each other and from the center of a line of sprocket holes located somewhat near the center of the tape. Also, two different standards of sprocket hole locations exist. According to a first standard, the centers of the sprocket holes are located substantially 0.392 inches from one edge of the tape, and according to the second standard, the centers of the sprocket holes are located substantially 0.437 inches from the corresponding edge of the tape. In all cases, however, the center distances between adjacent perforations (both sprocket hole and data perforation distances) is the same when measured laterally of the tape, i.e., 0.100 inches.

The existence of the above noted different standard tape widths and sprocket hole locations gives rise to problems in providing a tape reader capable of handling different types of perforated tape. This problem is somewhat alleviated by virtue of the fact that generally only four standard tape sizes are in common use, namely: (1) A ⅞ inches wide, 7-level tape with sprocket hole centers located 0.437 inches from one edge. (2) A 1 inch wide, 8-level tape with sprocket hole centers location 0.437 inches from one edge. (3) A ⅞ inch wide, 6-level tape with sprocket hole centers located 0.392 inches from one edge. (4) An 11/16 inch wide, 5-level tape with sprocket hole centers located 0.437 inches from one edge.

SUMMARY OF THE INVENTION

The present invention provides the simple and inexpensive perforated tape reader for sensing any of a plurality of different types and sizes of perforated tape. For this purpose, a single tape drive sprocket is employed, along with an adjustable edge guide element which is readily adjustable into any of a plurality of positions to edge guide tapes of respective sizes in proper relation to the drive sprocket and the perforation sensing device.

Means under control of the tape guide element is provided to properly locate the tape during threading of the same in the reader so as to align the sprocket perforations in the tape with the drive sprocket. Thus, a single adjustment is all that is necessary to change the reader to accept tapes of different sizes and styles.

The invention is particularly applicable to photoelectric tape readers and a swinging cover is provided to prevent dust or dirt from settling on the hole sensing components and on the operating mechanism, such cover carrying part of the hole sensing components and also providing guide means for maintaining the tape in proper position relative to the hole sensing components, the tape guide and the drive sprocket.

DESCRIPTION OF THE PREFERRED EMBODIMENT

Figures 1, 2, 3, 4:
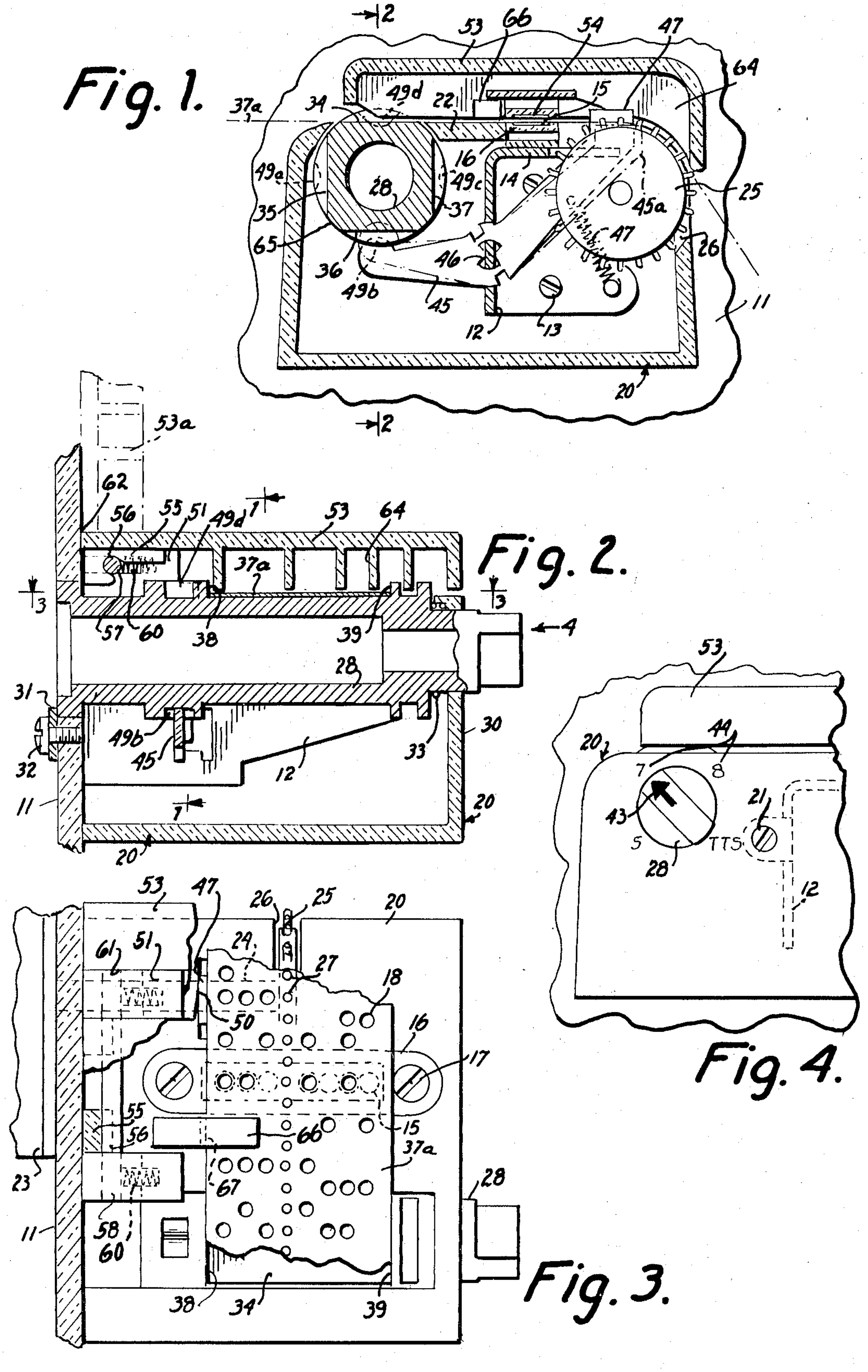
FIG. 1 is a sectional view through a preferred embodiment of the invention and is taken substantially along the line 1—1 of FIG. 2.
FIG. 2 is a transverse sectional view taken along 2—2 of FIG. 1.
FIG. 3 is a sectional plan view taken along line 3—3 of FIG. 2 with part of the cover broken away.
FIG. 4 is a fragmentary front view taken in the direction of the arrow 4 in FIG. 2.

Referring to the drawings, the tape reader comprises a base member 11 forming a wall which is suitably supported in a vertical position. A bracket 12 is secured to the base member 11 by screws 13 and has a shelf 14 formed thereon to support a plurality of light sensing devices, preferably photo-transistors, one of which is shown at 15, which are mounted on a carrier 16 secured to the shelf 14 by screws 17. One such phototransistor 15 is provided for each possible row of data perforations 18 formed in a perforated tape, i.e., 37*a.*

A hollow plastic cap member 20 is secured to the outer end of bracket 12 by a screw 21 (FIG. 4) and has an upper wall 22 forming a tape guide surface which extends coplanar with the upper surface with phototransistor carrier 16.

A stepping motor, partly indicated at 23 (FIG. 3), is suitably secured to the base 11 and has a drive shaft 24 on which is mounted a tape drive sprocket 25. The latter is located on one side of the photo-transistors 15 and within a slot 26 formed in the cap member 20. The sprocket 25 is engageable with a line of sprocket holes 27 located approximately along the center of the tape so as to drive the same through the read head.

An edge guiding spool 28 is located on the side of the photo-transistors 15 opposite the sprocket 25 and is rotatably mounted at one end in a bearing formed in the base 11 and at its opposite end in a bearing formed in the front wall 30 of the cap member 20. A guide washer 31 which is held against the base 11 by a screw 32 maintains the spool 28 in proper axial position against a compression spring 33 extending between a shoulder on a spool and the wall 30 of the cap member 20.

The spool 28 has four flat tape guide sections 34, 35, 36 and 37 formed thereon and disposed at 90° to each other. The uppermost guide section, depending on the rotated position of the spool 28, extends coplanar with the upper guide surface of the wall 22, as seen in FIG. 1.

Figure 5:
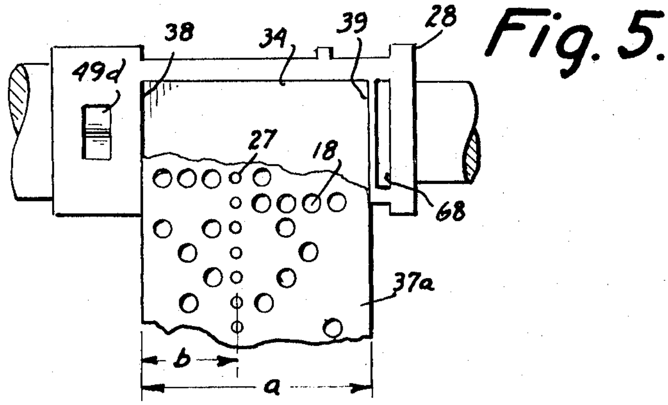
FIGS. 5, 6, 7 and 8 show different sides of the tape edge guide spool and their relation to corresponding sizes and types of perforated tape.
Figure 6:
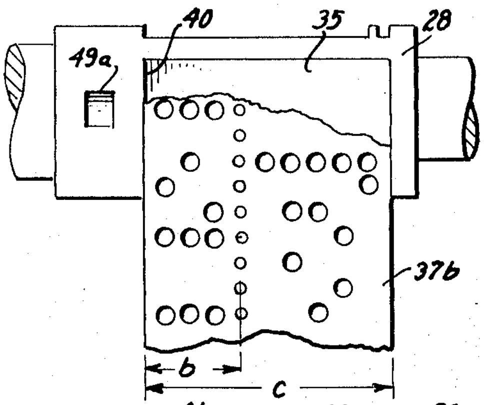

As shown in FIGS. 2, 3 and 5, the guide section 34 is bounded on its sides by edge-guide shoulders 38 and 39 which are spaced apart a distance for guiding a ⅞ inch wide, 7-level, perforated tape 37*a.* Also, the shoulder 38 is located at a distance *b* from the center line of sprocket holes 27 so as to properly guide the tape 37*a* onto the sprocket 25. In this case the distance *b* is 0.392 inches.

Figure 7:
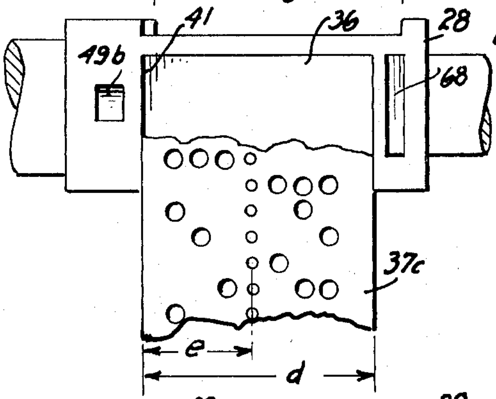

As shown in FIG. 7, the guide section 36 has a width *d* sufficient to guide a ⅞ inch wide, 6-level tape 37*c*. However, in this case, the left hand guide shoulder 41 is located at a distance *e* from the sprocket holes of tape 37*c* which is greater than the dimension *b* and, therefore, the tape 37*c* will be offset from the similar width tape 37*a* by an amount equal to *e–b*. Here, the distance *e* is 0.437 inches.

Figure 8:
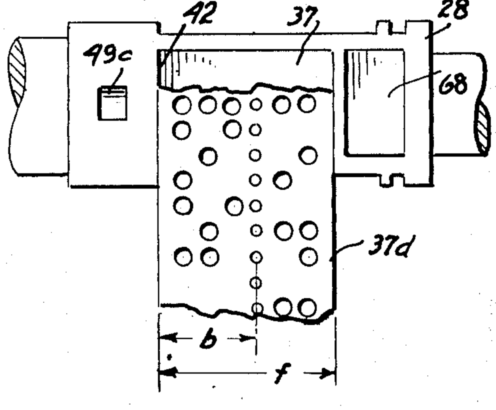

As shown in FIG. 8, the cut-out section 37 has a width f for guiding an 11/16 inch wide, 5-level tape 37*d* in which the left hand shoulder 42 is aligned with the shoulders 38 and 40.

To properly adjust the spool 18 to accommodate a particular tape to be read, an index mark 43, FIG. 4, is formed on the outer end of the spool 28 and is movable relative to indicia 44 formed on the cap member 20 to identify the different tapes which the reader can accommodate.

For the purpose of detenting the spool 28 in any of its four different tape-guiding positions, a detening lever 45 is pivotally supported at 46 by the bracket 12 and is urged clockwise by a tension spring 47 extending between the lever 45 and a part of the bracket 12 to engage, at one end thereof, the spool 28 and to fall into any one of three shallow notches 49*a*, 49*b*, 49*c* or one deep notch 49*d* when the spool is located in a tape-guiding position. When any of the shallow notches is engaged by the detenting lever 45, an edge-guiding portion 47, (FIGS. 1 and 3) located at the opposite end of the detenting lever 45, extends above the level of the path of the tape, i.e., 37*a*, as shown in FIG. 1, to thus edge-guide the leading portions of certain tapes, i.e., 37*a*, 37*b* and 37*d* so as to align the sprocket holes 27 with the sprocket 25, particularly when installing the tape in the reader. However, when the spool 28 is rotated to locate the tape guide section 36 in uppermost guiding position for a tape 37*c*, the deep notch 49*d* is engaged by the detent lever 45, permitting the spring 47 to rock the lever 45 clockwise into its dot-dash position 45*a* to locate its edge-guiding portion 47 below the tape path. Accordingly, the tape can be moved laterally until it engages an edge-guiding surface 50 formed on an ear 51 extending from the base 11 so as to properly align the sprocket holes 27 of tape 37*c* with the sprocket 25 even though the left edge distance *e* is greater than the normal edge distance *b*.

A cover 53 is provided which is movable between its closed position shown in full lines in FIGS. 1, 2 and 4 and its open position shown by the dot and dash lines 53*a*. Cover 53 performs several functions, namely: (1) It prevents dust and dirt from settling on the operating parts. (2) It maintains the tape against the tape-guiding surface on the upper wall 22 as well as against the tape guide spool 28 and sprocket 25. (3) It indicates whether or not the tape spool 28 is in proper detented position. (4) It carries light emitting elements, preferably light emitting diodes 54, which are aligned with respective photo-transistors 15 and (5) it shields the photo-transistors 15 from stray exterior light.

The cover 53 has two spaced hinge pieces 55 which embrace a hinge pin 56. The latter is slidable transversely in slots 57 formed in the aforementioned ear 51 and in a second ear 58. Compression springs 60 urge the hinge pin 56 to the left (in FIGS. 2 and 3) to normally abut the cover 53 against the base 11 to form a light and dust-tight joint. Ears 51 and 58 extend through mating openings 61 in the cover so that a dust and light-tight joint is formed therebetween when the cover is closed.

When the cover 53 is raised into its open position 53*a* for the purpose of threading the tape, the upper left hand corner 62 thereof will cam along the side of the base 11 and thus shift the hinge pin 56 along the slots 58 until the cover reaches its open position where it will also be retained by the springs 60.

Tape guide shoes 64 are formed integral with the cover 53 and extend adjacent the top tape guide wall 22 so that when the cover 53 is closed, the tape shoes cooperate with the guide spool 28 and the upper guide wall 22 to form a tape guide channel which guides the tape onto and over the sprocket 25. The cover 53, when in closed position, also maintains the light emitting diodes 54 directly above and in alignment with respective ones of the photo-transistors 15.

Cut-out sections 68 are formed in the spool 28 adjacent guide sections 34, 36 and 37 to receive those guide shoes 64 which are located to the right of such sections.

In the event that the tape spool 28 is not in proper detented position, the guide shoes 64 will be engaged by a corner, i.e., 65, intermediate adjacent ones of the tape guide sections 34 to 37 and will thus hold the cover 53 above its normally closed position to thus indicate that the tape spool is not in proper detented position.

A tape hold-down member 66 extends upwardly from the upper wall 22 of the cap 20 and has a guide slot 67 therein to receive and hold the tape adjacent the upper guide surface of the top wall 22 during lateral threading of the tape and prior to closing the cover 53.

Obviously, if other widths of tape are to be read than those disclosed herein, a guide spool having guide sections of appropriate widths can be readily substituted for the spool 28. Also, if tapes having sprocket hole positions other than those disclosed, a detent lever having an appropriate thickness can be readily substituted for detent lever 45.

I claim:

1. A perforated tape reading head for reading multi-level
perforated tapes of different widths comprising perforation sensing means,
means for driving a perforated tape past said sensing means,
a rotatable tape guide member located in the path of said tape,
said guide member having different sets of tape edge-guiding shoulders located in different positions around said guide member,
said sets of shoulders being adapted to guide respective tapes of different widths,
means supporting said guide member for movement into different positions to present different ones of said sets of shoulders to said tape path, and
means for detenting said guide member in any of said positions thereof.

2. A perforated tape reading head according to claim 1 comprising
a device having a tape edge-guiding portion spaced from said guide member, and
means controlled by said guide member in certain of said positions thereof for locating said device in the path of said tape and controlled by said guide member in certain other of said positions thereof for locating said device out of the path of said tape.

3. A perforated tape reading head according to claim 2 wherein said last mentioned means comprises said means for detenting said spool.

4. A perforated tape reading head according to claim 1 comprising a detenting member, spring means urging said detenting member into detenting engagement with said guide member, said detenting member having a tape edge-guiding portion thereon, and means on said guide member for causing said detenting member to position said edge-guiding portion thereof in said tape path in certain only of said positions of said guide member.

5. A perforated tape reading head for reading multilevel perforated tapes of different widths comprising a body forming a first guiding surface for guiding a tape in a predetermined path, means for driving a perforated tape over said guiding surface, a tape guide spool located in the path of said tape, said spool having different sets of tape edge-guiding shoulders located in different positions around said spool, said sets of shoulders being adapted to guide respective tapes of different widths, means supporting said spool for pivotal movement into different positions to present different ones of said sets of shoulders to said tape path, a cover movable between open and closed positions relative to said tape guiding surface, said cover having a second guiding surface for maintaining said tape in engagement with said first tape guiding surface and between a set of said edge-guiding shoulders, means for sensing perforations in said tape, said last mentioned means comprising a light emitting component and a light sensing component, means on said body supporting one of said components, and means on said cover supporting the other of said components.

6. A perforated tape reading head according to claim 5 comprising indicia on said body, and an index element on said spool movable relative to said indicia for indicating the width of tape to be guided by said spool in each of said positions thereof.

7. A perforated tape reading head according to claim 5 comprising pivot means carried by said body for supporting said cover for movement between said open and closed positions, and yieldable means urging said pivot means toward said body whereby to form a light excluding joint between said body and said cover.

8. A perforated tape reading head according to claim 5 wherein said yieldable means yieldably detents said cover in said open and closed positions.

* * * * *